United States Patent [19]

Keil

[11] Patent Number: 4,624,998

[45] Date of Patent: Nov. 25, 1986

[54] SILICONE-MODIFIED EPOXY RESINS HAVING IMPROVED IMPACT RESISTANCE

[75] Inventor: Joseph W. Keil, Midland, Mich.

[73] Assignee: Dow Corning Corporation, Midland, Mich.

[21] Appl. No.: 814,462

[22] Filed: Dec. 30, 1985

[51] Int. Cl.[4] ............................................. C08F 283/00
[52] U.S. Cl. ..................................... 525/476; 525/523; 528/25; 528/26; 528/27; 524/267; 524/268; 524/265
[58] Field of Search ................... 525/523, 476; 528/25, 528/26, 27; 524/267, 268, 265

[56] References Cited

U.S. PATENT DOCUMENTS 3,843,577 10/1974 Keil ..................................... 260/29.1
3,926,885 12/1975 Keil ..................................... 260/29.1

FOREIGN PATENT DOCUMENTS 54-54168 4/1979 Japan .
4902385 3/1985 Japan .

OTHER PUBLICATIONS

"Siloxane Modifiers for Epoxy Resins", Gov't. Accession No. AD-A136,782, 12/1/83-Yorkgitis et al.

*Primary Examiner*—Melvyn I. Marquis
*Attorney, Agent, or Firm*—Alexander Weitz; James E. Bittell

[57] ABSTRACT

This invention relates to a dispersion of a functional silicone modifier in a curable epoxy resin wherein emulsification of said silicone is aided by a siloxane-polyoxyalkylene copolymer. The silicone modifier comprises an alpha,omega-functional polydimethylsiloxane having carboxyl, amine or epoxide endgroups. A method of using the dispersion to improve the impact resistance of the resin, when the latter is cured, is described.

20 Claims, No Drawings

27
SILICONE-MODIFIED EPOXY RESINS HAVING IMPROVED IMPACT RESISTANCE

BACKGROUND OF THE INVENTION

This invention relates to a dispersion of a functional silicone modifier in a curable epoxy resin wherein emulsification of said silicone is aided by a siloxane-polyoxyalkylene copolymer. More specifically, the present invention relates to a dispersion of an alpha,omega-functional polydimethylsiloxane having carboxyl, amine or epoxide endgroups. This invention further relates to a method of using the dispersion to effect improved impact resistance of the resin when the latter is cured. Still further, this invention relates to an article of manufacture which comprises said dispersion in a cured state.

Epoxy resins form an important class of thermosetting polymers that generally exhibit high tensile strength, high modulus, good chemical and corrosion resistance and good dimensional stability. Unfortunately, cured epoxy systems are usually brittle, which characteristic severely limits their utility in many applications requiring high impact and fracture strength. This shortcoming has been overcome to some extent by the well-established technique of incorporating rubber particles into the cured epoxy matrix. The rubber tends to separate into a second dispersed phase during the cure of the epoxy resin. It is believed that these rubbery domains act to relieve stress during deformation, which results in improved toughness and impact resistance of the so-modified epoxy resin. Thus, for example, liquid butadiene-acrylonitrile copolymers, having either carboxyl or amine end groups, have been widely used to modify epoxy resins.

Even though modification with relatively small quantities of such materials can lead to significant improvement in impact resistance, further augmentation is still desirable. Moreover, these copolymeric modifiers themselves suffer from characteristics which limit their utility to a narrow temperature range, namely a relatively high glass transition temperature and poor thermal and oxidative stability. Silicones, on the other hand, are known to have good thermal stability as well as applicability over a wide temperature range. Silicones have indeed been disclosed as impact resistance modifiers for epoxy resins, but it is only certain expensive varieties that have demonstrated utility for this purpose. Japanese Patent No. 60/049,023 discloses organopolysiloxanes containing perfluoroalkyl groups which, in combination with an inorganic filler, may be used to improve impact resistance of an epoxy resin. Likewise, Yorkgitis et al. ("Siloxane Modifiers for Epoxy Resins," Govt. Accession No. AD-A136,782, Dec. 1, 1983), found that modification with amine-terminated copolymers of dimethylsiloxane with diphenylsiloxane or with methyltrifluoropropylsiloxane led to improved fracture toughness in a bisphenol-A epoxy resin while a similarly terminated homopolymer of polydimethylsiloxane actually reduced toughness relative to the control. It would, therefore, be advantageous if the less expensive and readily available polydimethylsiloxanes could be used to improve the impact resistance of epoxy resins.

It is known that non-organofunctional polydimethylsiloxane fluids and gums can be dispersed in various resins with the aid of dispersants based on siloxane resin-polyoxyalkylene copolymers or polydimethylsiloxane-polyoxyalkylene copolymers. Keil, in U.S. Pat. Nos. 3,843,577 and 3,926,885, the disclosures of which are hereby incorporated by reference, described such dispersions of non-organofunctional polydiorganosiloxanes in epoxy resins in order to effect a self-lubricating surface thereon. Compositions taught by Keil, however, exhibited little or no improvement of impact resistance over unmodified controls.

Unexpectedly, it has now been found that when a polydimethylsiloxane fluid having carboxyl, amine or epoxide terminal groups is dispersed in a curable epoxy resin, significant improvement in impact resistance of the cured system results.

SUMMARY OF THE INVENTION

This invention relates to a dispersion comprising:

a. from about 78 to 94.5 percent by weight of a curable epoxy resin;

b. from about 5 to 20 percent by weight of an alpha,omega-functional polydimethylsiloxane having an average degree of polymerization between 30 and 400 and having endblocking groups containing carboxyl, amine or epoxide functionality; and c. from about 0.5 to 2.0 percent by weight of a dispersing agent capable of maintaining (b) dispersed in (a), said dispersing agent being a siloxane copolymer selected from the group consisting of 1. copolymers consisting essentially of $SiO_2$ units, $(CH_3)_3SiO_{\frac{1}{2}}$ units and $D(CH_3)_2SiO_{\frac{1}{2}}$ units in which D is a polyoxyethylene polymer having a molecular weight between 1000 and 5000, or a polyoxyethylene-polyoxypropylene copolymer having a molecular weight between 1000 and 6000 wherein the polyoxypropylene portion constitutes up to 100 mole percent of the copolymer, said D being attached to the silicon atom via a silicon-carbon bond, and the ratio of the $SiO_2$ units to the total $(CH_3)_3SiO_{\frac{1}{2}}$ and $D(CH_3)_2SiO_{\frac{1}{2}}$ units is in the range of 1:0.4 to 1:1.2, 2. copolymers which are reaction products derived from heating a mixture of a siloxane resin copolymer consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1:0.4 to 1:1.2, and a hydroxylated polyoxyethylene polymer having a molecular weight in the range of 1000 to 5000 or a hydroxylated polyoxyethylene-polyoxypropylene copolymer having a molecular weight in the range of 1000 to 6000 wherein the polyoxypropylene portion constitutes up to 100 mole percent of the copolymer, 3. polydimethylsiloxane-organic copolymer in which the polydimethylsiloxane portion has a molecular weight between 1500 and 2000 and the organic portion consists essentially of a polyoxyethylene polymer having a molecular weight between 1000 and 2000, or a polyoxyethylene-polyoxypropylene copolymer having a molecular weight between 1500 and 4000 wherein said polyoxypropylene portion constitutes no more than 100 mole percent of organic portion of the copolymer, said organic portion being attached to silicon atoms via silicon-carbon bonds, and 4. polydimethylsiloxane-organic copolymers which are the reaction products produced by heating a mixture of a polydimethylsiloxane containing silicon bonded hydrogen atoms having a molecular weight between 1500 and 2000 and a hydroxylated polyoxyethylene having a molecular weight between 1000 and 2000, or a hydroxylated polyoxyethylene-polyoxypropylene copolymer having a molecular weight between 1500 and 4000 wherein said polyoxypropylene constitutes up to 100 mole percent of the organic portion of the copolymer.

This invention further relates to a method for improving the impact resistance of a curable epoxy resin, comprising: (A) emulsifying from about 5 to 20 percent by weight of component (b), described above, in a curable epoxy resin, using as dispersing agent from about 0.5 to 2.0 percent of one of the siloxane-polyoxyalkylene copolymers described above, to form a homogeneous dispersion; (B) mixing said dispersion with an appropriate amount of cure agent for the epoxy resin to produce a uniform mixture therebetween; and (C) curing the mixture obtained in step B.

This invention still further relates to an article of manufacture, comprising a cured epoxy resin composition prepared in accordance with the above method.

DETAILED DESCRIPTION OF THE INVENTION

The compositions of this invention comprise a homogeneous dispersion of (a) a curable epoxy resin, (b) a silicone modifying fluid which comprises an alpha,omega-functional polydimethylsiloxane fluid, wherein said functionality can be carboxyl, amine or epoxide and (c) a siloxane-polyoxyalkylene copolymer dispersing agent capable of maintaining (b) dispersed in (a).

In the preferred method for using the dispersions of this invention, the silicone modifying fluid is first emulsified in the curable epoxy by blending these two components, along with the siloxane copolymer dispersing agent (dispersant), described infra. Emulsification can be carried out by methods well known in the art, such as mixing in a high shear mixer, until the combination is smooth and uniform. The resulting dispersion is then mixed with a cure agent, employed at an appropriate level and dependent upon the nature of epoxy resin and curative selected, whereafter the combined mixture is polymerized (cured) to the solid state by methods well known in the art, such as application of heat. Additionally, cure accelerators, such as metal salts or tertiary amines, fillers, pigments and various additives normally used in conjunction with epoxy resin systems, may be incorporated separately, or in combination, to provide a final formulation. This formulation, in turn, is cured after being molded, cast or otherwise shaped into an article of manufacture or used as an adhesive to bind substrates to one-another after curing. These methods are well known by those of ordinary skill in the epoxy resin art and are within the scope of this invention when the aforesaid dispersions are employed in such formulations.

When the epoxy resin dispersions of this invention are so prepared and cured, they generally exhibit improvement in Izod notched impact strength, ranging approximately from 20 to 100 percent higher than unmodified, similarly cured, epoxy systems. Additionally, the dispersions of this invention generally exhibit lower viscosities than compositions which utilize copolymers of butadiene-acrylonitrile for impact strength augmentation. This clearly provides an advantage in processing the dispersions of this invention relative to such traditional systems. Finally, due to the presence of the polydimethylsiloxane chain of the modifying fluid (component b), the benefits of incorporating these low surface energy materials into the resin are also achieved. Thus, the cured systems of this invention have a lower coefficient of friction than traditional systems and therefore also offer greater wear resistance and improved release from molds.

An article of manufacture, wherein the cured composition comprises the dispersion of this invention, is also within the scope of this invention.

The first component of the dispersions of this invention is a curable epoxy resin (a), which is well known in the art. The epoxy resin may be saturated or unsaturated, cycloaliphatic, aromatic, heterocyclic or aliphatic, and may be substituted if desired with chlorine atoms, hydroxyl groups, ether radicals and the like. Furthermore, it may be monomeric or polymeric. The epoxy compounds have an average of more than one 1,2-epoxide group per molecule which may be present as an interior or terminal group. Epoxy resins which are liquid at room temperature are most preferred for utilization in the dispersions of this invention. Of course, normally solid resins can be used if the dispersion is formed at elevated temperatures or in the presence of a solvent.

Preferred epoxy resins which may be used in these compositions include bisphenol-A/ epichlorohydrin resins, epoxy novolac resins, cycloaliphatic epoxy resins, or alicyclic diepoxy carboxylate resin. These, and other epoxy resins, all well known in the art, are further described in, e.g., Lee and Neville, Handbook of Epoxy Resins, McGraw-Hill Inc. (1967), and are within the scope of this invention.

The epoxy resin may constitute approximately 78 to 95% by weight of the composition of said dispersion to be within the scope of this invention. Preferably the epoxy resin constitutes from 89 to 94.5% of the dispersion.

As curing agents to be used with the curable epoxy resin compositions of the present invention, there may be mentioned those conventionally employed as crosslinking agents for epoxy resins. Although different curing agents may be used with a given epoxy resin, preferred combinations and quantities are often recommended by the manufacturers of these resins, as is known in the art. Examples include aliphatic and aromatic primary and secondary amines such as diethylenetriamine and 2-aminoethylpiperazine, anhydrides such as the maleic anhydride adduct of methylcyclopentadiene, chlorendic anhydride and hexahydrophthalic anhydride, and polymers of melamine-formaldehydes, urea-formaldehydes and phenol-formaldehyde. These and other curatives for epoxy resins are well known in the art and further described in Handbook of Epoxy Resins, cited supra.

The second component (b) of this invention is an alpha, omega-functional polydimethylsiloxane wherein the terminal groups contain carboxyl, amine or epoxide functionality.

A preferred example of the carboxyl end-blocked polydimethylsiloxane fluids of this invention may be represented by the formula

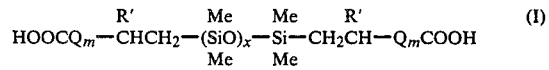

$$HOOCQ_m-CHCH_2-(SiO)_x-Si-CH_2CH-Q_mCOOH \quad (I)$$

with R' above each CH and Me above/below each Si.

wherein Me represents the methyl radical, R' is hydrogen or methyl, and m is 0 or 1. Q, when present, denotes a divalent hydrocarbon radical free of aliphatic unsaturation such as an aromatic radical, such as phenylene, tolylene and naphthylene, an aliphatic radical, such as methylene, ethylene and branched or linear propylene, butylene, octylene, decylene, dodecylene and hexadecylene and combinations of aromatic and aliphatic radicals, such as benzylene. Preferably Q has from 1 to 20 carbon atoms. Most preferred is the fluid wherein Q is octamethylene, R' is hydrogen and m is 1. In the above formula, x is the nominal degree of polymerization (D.P.) of the polydimethylsiloxane chain and may have a value from about 30 to about 400. The preferred D.P. ranges from 30 to 300 and results in the greatest improvement in impact strength. These fluids may be prepared by methods disclosed by Keil and Ross in copending and commonly-assigned U.S. patent application Ser. No. 715,320, filed Mar. 25, 1985, wherein the carboxyl group of a terminally unsaturated carboxylic acid is first capped with a trimethylsilyl group, then the terminal bond of the capped acid is hydrosilylated with a polydimethylsiloxane having terminal SiH groups, and finally the trimethylsilyl capping group is removed by hydrolysis. The capping step is necessary to temporarily block the carboxyl group during subsequent hydrosilylation reaction wherein gel formation can occur if this procedure is not followed.

Other alpha,omega-carboxyfunctional polydimethylsiloxanes known in the art may also be employed as modifying component (b) of this invention.

The alpha,omega-carboxyfunctional polydimethylsiloxane (Formula I, above) can be reacted with 2-aminoethylpiperazine (AEP), to form an alpha,omega-aminofunctional polydimethylsiloxane represented by the formula

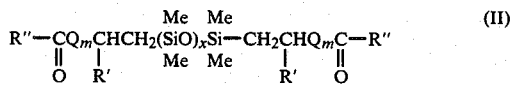

wherein R" is

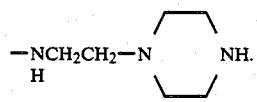

This resulting compound (Formula II), obtained due to the preferrential reactivity of the primary amine on the AEP toward the carboxyl group of Formula I, has secondary amine terminal groups. In the preferred embodiment of the amine-functional polydimethylsiloxane, Q is again octamethylene, R' is hydrogen and m is 1.

Alternatively, an alpha,omega-aminofunctional polydimethylsiloxane may be prepared by equilibrating a cyclopolydimethylsiloxane such as $(Me_2SiO)_4$ with an aminofunctional disiloxane endblocker, examples of which are represented by the formulas

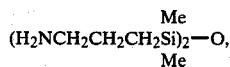

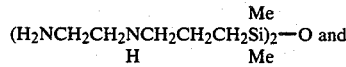

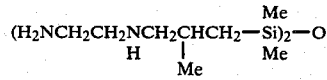

using a basic catalyst such as potassium hydroxide. Other alpha,omega-aminofunctional polydimethylsiloxanes known in the art are also within the scope of the present invention.

An alpha,omega-epoxyfunctional polydimethylsiloxane may be prepared by hydrosilylating an unsaturated glycidyl ether, such as allyl glycidyl ether, with a polydimethylsiloxane having terminal SiH functionality.

The modifying alpha,omega-functional polydimethylsiloxane component (b) may constitute approximately 5 to 20% of the composition of said dispersion to be within the scope of this invention. Preferably the (b) component constitutes from 5 to 10% of the dispersion.

The third component (c) of the composition of this invention functions to maintain discrete particles of the silicone modifier (b) dispersed throughout the epoxy resin (a). Four types of siloxane dispersing agents have been found which will serve this purpose, and all are well known in the art. One siloxane dispersing agent useful herein is a siloxane copolymer consisting essentially of $SiO_2$ units, $(CH_3)_3SiO_{\frac{1}{2}}$units and $D(CH_3)_2SiO_{\frac{1}{2}}$units in which D is a polyoxyethylene polymer having a molecular weight between 1000 and 5000, or a polyoxyethylene-polyoxypropylene copolymer having a molecular weight between 1000 and 6000 wherein the polyoxypropylene portion constitutes up to 100 mole percent of the copolymer, said D being attached to the silicon atom via a silicon-carbon bond, and the ratio of the $SiO_2$ units to the total $(CH_3)_3SiO_{\frac{1}{2}}$and $D(CH_3)_2SiO_{\frac{1}{2}}$units is in the range of 1:0.4 to 1:1.2.

A second siloxane dispersing agent useful herein is a siloxane copolymer reaction product derived from heating a mixture of a siloxane resin copolymer consisting essentially of $SiO_2$ units and $(CH_3)_3SiO_{\frac{1}{2}}$units in which the ratio of $SiO_2$ units to $(CH_3)_3SiO_{\frac{1}{2}}$units is in the range of 1:0.4 to 1:1.2, and a hydroxylated polyoxyethylene polymer having a molecular weight in the range of 1000 to 5000 or a hydroxylated polyoxyethylene-polyoxypropylene copolymer having a molecular weight in the range of 1000 to 6000 wherein the polyoxypropylene portion constitutes up to 100 mole percent of the copolymer. It is believed that these dispersing agents differ from those described immediately above only in that the polyoxyalkylene portion is attached to the silicon atom via a silicon-oxygen-carbon bond instead of a direct silicon-carbon bond. It is theorized that the reaction upon heating takes place between residual silanol known to exist in the siloxane and the hydroxyl groups in the polyoxyalkylene. Formation of the reaction product is facilitated by the use of a catalyst known to promote the silanol-carbinol condensation reaction, examples of such catalysts being bases such as potassium hydroxide and metal salts such as stannous octoate.

A third dispersing agent useful in this invention is a polydimethylsiloxane-organic copolymer in which the polydimethylsiloxane portion has a molecular weight between 1500 and 2000 and the organic portion consists essentially of a polyoxyethylene polymer having a molecular weight between 1000 and 2000, or a polyoxyethylene-polyoxypropylene copolymer having a molecular weight between 1500 and 4000 wherein said polyoxypropylene portion constitutes up to 100 mole percent of organic portion of the copolymer, said organic portion being attached to silicon atoms via silicon-carbon bonds.

The final silicone dispersing agent useful herein is a siloxane-organic copolymer which is the reaction product produced by heating a mixture of a polydimethylsiloxane, containing silicon bonded hydrogen atoms, having a molecular weight between 1500 and 2000 and a hydroxylated polyoxyethylene having a molecular weight between 1000 and 2000, or a hydroxylated polyoxyethylene-polyoxypropylene copolymer having a molecular weight between 1500 and 4000 wherein said polyoxypropylene constitutes up to 100 mole percent of the organic portion of the copolymer. As in the case of the second dispersing agent described above, the siloxane and organic portions of the copolymer are linked through silicon-oxygen-carbon bonds. It is theorized that the reaction upon heating (for about two hours at reflux in, for example, xylene solution) takes place between the silicon bonded hydrogen atoms in the siloxane and the hydroxyl groups in the polyoxyalkylene. Formation of the reaction product is facilitated by the use of a catalyst known to promote the SiH-carbinol condensation reaction, examples of such catalysts being chloroplatinic acid and metal salts such as stannous octoate.

For the purpose of this invention, the second of the above dispersing agents is preferred wherein a polyoxyethylene-polyoxypropylene copolymer, having a molecular weight of about 4,000 and an equal content of polyoxyethylene and polyoxypropylene groups, is reacted with said siloxane resin copolymer having $SiO_2$ units and $(CH_3)_3SiO_{\frac{1}{2}}$ units in a molar ratio of approximately 1:0.75. It is believed at this time that the optimum weight ratio for this dispersant is about 3 parts of the polyoxyalkylene copolymer for each part of the siloxane resin copolymer. Preferably, one part of the dispersant is employed for each ten parts of said modifying fluid. The dispersant may, in turn, be contained in a diluent such as a polyglycol, a plasticizer or a nonionic surfactant. In the latter case, the amount of dispersant required must be determined on a non-diluted basis.

Further descriptions, and methods of preparation, of these silicone dispersing agents can be found in U.S. Pat. Nos. 3,843,577 and 3,926,885, cited supra, as well as U.S. Pat. Nos. 3,402,192, 3,518,288 and 3,984,347, the disclosures of which are hereby also incorporated by reference. The siloxane resin copolymers, employed in the preparation of the first and second category of dispersing agents, can be made according to methods detailed in U.S. Pat. No. 2,676,182, hereby incorporated by reference.

The following examples are offered for illustrative purposes and should not be construed as limiting the claimed invention. Except as noted to the contrary, all proportions are on a weight basis.

EXAMPLE 1

A 500 ml, 3-neck flask was fitted with a stirrer, thermometer, condenser and heating mantle. To the flask was added 92 g of undecylenic acid, 45 g of hexamethyldisilazane and 1 drop of trifluoroacetic acid. The mixture was heated to 100° C. for one hour and then stripped at 115° C. and 10 mm mercury to remove excess hexamethyldisilazane and ammonia. The resulting trimethylsilalated undecylenic acid was a clear, yellowish liquid and had a slight ammonia smell. It had the nominal formula $CH_2=CH(CH_2)_8COOSi(CH_3)_3$.

EXAMPLE 2

To a 100 ml, 3-neck flask fitted with a stirrer, thermometer, addition funnel, condenser, heating mantle and a nitrogen gas sweep was added 320 g of the trimethylsilalated undecylenic acid prepared in Example 1 along with 0.1 g of a 0.1 N solution of hexachloroplatinic acid in isopropyl alcohol. The mixture was heated to 95° C. with medium agitation. Through the addition funnel, 80 g of 1,1,3,3-tetramethyldisiloxane was slowly introduced. The temperature of the exothermic reaction was kept below 110° C. After addition of the disiloxane was complete, the mixture was allowed to react for an additional hour at 110° C., was then cooled to 70° C., and 60 g of water was added. This mixture was stirred for two hours at low agitation to regenerate the carboxyl groups. Excess water, and low molecular weight siloxane by-products were removed by heating at 120° C. and 10 mm mercury. The product was poured off at about 50° C. and it solidified at 36°–40° C. The product was determined to have the formula

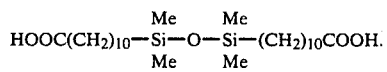

wherein Me represents the methyl radical.

EXAMPLE 3

To a 5 liter 3-neck flask fitted with a stirrer, thermometer, condenser and heating mantle was added 2809.5 g of cyclopolydimethylsiloxane having the general formula $(Me_2SiO)_n$ wherein n had an average value of about 5. Also added was 190.5 g of the carboxy-functional disiloxane of Example 2 as well as 3 g of a siloxane bond rearranging catalyst, trifluoromethane sulfonic acid. The components were heated to 55° C. for 6 hours with medium agitation and then cooled to 30° C., at which time the sulfonic acid catalyst was neutralized. The reaction product was then pressure-filtered through diatomaceous earth to remove neutralization salts. The product was determined to have a viscosity of 340 cP at 25° C., an acid number of 14 and the average formula

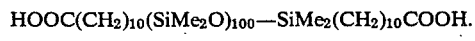

wherein Me represents the methyl group.

EXAMPLE 4

Into a 3-neck flask, fitted with a heating mantle, stirrer, thermometer, condenser, addition funnel and a nitrogen purge was added 1800 g of a carboxyl end-blocked polydimethylsiloxane fluid having an average degree of polymerization of 250 which was prepared by the methods described in Examples 1 through 3. The fluid was heated to 100° C. and 54 g (50% excess over stoichiometric requirement) of 2-aminoethylpiperazine (AEP) was introduced over a period of five minutes through the addition funnel while the mixture was stirred. The addition funnel was replaced with a water trap and the temperature was raised to 130° C. for 4 hours to remove water of condensation. Excess 2-aminoethylpiperazine was then stripped off at 150° C. and 10 mm mercury. The resulting aminoethylpiperazine-endblocked fluid had an average degree of polymerization of about 250, and acid number of 0.28, a neutral equivalent of 5900 and a viscosity of 4160 cP at 25° C.

EXAMPLE 5

A 1000 ml 3-neck flask, equipped with heating mantle, stirrer, condenser, thermometer and nitrogen gas purge was charged with 428.4 g of the cyclopolydimethylsiloxane used in Example 3, 71.7 g of an 2-aminoethylpiperazine (AEP) endblocked polydimethylsiloxane having an average degree of polymerization of 30 and prepared according to methods described in Example 4, and 0.3 g sodium hydroxide rearrangement catalyst. After heating this mixture for 6 hours at 150° C., the contents of the flask were cooled to 35° C. and the sodium hydroxide neutralized by adding 0.4 g of glacial acetic acid.

The product, which became thick and opaque upon standing overnight, was pressure-filtered after adding 100 g of toluene to reduce viscosity. The toluene was subsequently stripped off at 145° C. and 10 mm mercury to produce the final 2-aminoethylpiperazine endblocked fluid having an average degree of polymerization of about 250, a neutral equivalent of 4070 and a viscosity of 8,200 cP at 25° C. This procedure thus represents an alternate method of preparing the fluid of Example 4.

EXAMPLE 6

A 1000 ml 3-neck flask, equipped with heating mantle, stirrer, condenser, thermometer and nitrogen gas purge was charged with 493.4 g of $(Me_2SiO)_n$, wherein n had an average value of about 5, 6.35 g of 1,3-Bis(3-aminopropyl)-1,1,3,3-tetramethyldisiloxane and 0.3 g of potassium hydroxide. This mixture was stirred and heated at 150° C. for 6 hours. After cooling the reacted mixture, 0.4 g of glacial acetic acid was added to neutralize the KOH catalyst. The product, which contained equilibrated cyclic polydimethylsiloxanes, was pressure filtered and stored under nitrogen. The fluid had a viscosity of 800 cP, a neutral equivalent of 13,800 and a degree of polymerization of about 250.

EXAMPLE 7

A 500 ml 3-neck flask, equipped with heating mantle, stirrer, condenser, thermometer and nitrogen gas purge was charged with 70.0 g of an alpha,omega-SiH-functional polydimethylsiloxane having a D.P. of about 250, 1.35 g of allyl glycidyl ether and 0.05 g of sodium acetate. The mixture was heated to 90° C., and 0.1 g of a 0.1 N solution of chloroplatinic acid in isopropanol was introduced to catalyze the hydrosilylation. The reaction was allowed to continue for 2 hours while the temperature was controlled at about 110° C. At this point, no residual SiH functionality was detected. The viscosity of this epoxide-functional fluid was 1,280 cP at 25° C.

EXAMPLE 8

A copolymeric dispersing agent (dispersant) was prepared by a method similar to that employed in Example 1 of U.S. Pat. No. 3,843,577, cited supra. A siloxane resin copolymer, consisting essentially of $SiO_2$ units and $(CH_3)_3SiO_{\frac{1}{2}}$ units in a molar ratio of approximately 1:0.75, was added at a level of 4.7 parts to 15 parts of Ucon ®50-HB-5100 (Union Carbide Corporation, Danbury, CT). Ucon ®50-HB-5100 is described as an alcohol-started polymer containing equal amounts by weight of oxyethylene and oxypropylene groups and having a molecular weight of about 4000. The above mixture was refluxed for eight hours in a xylene solution (40 parts) along with 0.1 part of stannous octoate condensation catalyst. After neutralization of the catalyst with 0.07 part phosphoric acid, 40 parts of a polyoxypropylene-polyoxyethylene triol polymer having a molecular weight of about 2,600 (Polyglycol 15-200, Dow Chemical Company, Midland, MI) was added and the xylene stripped out. The resultant fluid was filtered and contained 33% active dispersant copolymer in the Polyglycol 15-200.

EXAMPLE 9

Carboxyl-functional and epoxide-functional polydimethylsiloxanes of different degrees of polymerization (D.P.) were prepared according to the methods of Examples 3 and 7 and used to modify a bisphenol-A/epichlorohydrin epoxy resin. Each of the siloxane fluids was emulsified in D.E.R. ®331 (Dow Chemical Company, Midland, MI) at a 10% (or 5%) level using 3% (or 1.5%) of the dispersant of Example 8. Dispersion was accomplished by mixing the three components in a high shear mixer till a smooth, uniform consistency was attained. To each dispersion so formed there was added 12 parts of diethanolamine cure agent (based on 100 parts of epoxy resin employed) and the resultant mixture was de-aired under vacuum. Specimens measuring 0.5 in ×0.5 in ×2.5 in, were cured in silicone rubber molds at 60° C. for 16 hours. These samples were subjected to notched Izod impact tests according to American Society for Testing and Materials (ASTM) method D 256. Results are presented in Table I.

For comparison purposes, a trimethylsilyl endblocked polydimethylsiloxane fluid having a viscosity of 1000 cS at 25° C. (D.P. of about 200) was used to modify D.E.R. ®331 at a level of 10% using 3% of the dispersant of Example 8 (i.e., 1% active dispersant). Additionally, copolymers widely used in the art to toughen epoxy resins, were evaluated in D.E.R. ®331. Hycar ® CTBN 1300X8 and Hycar ® ATBN 1300X16 (B. F. Goodrich Company, Cleveland, OH) are described as carboxyl-terminated and amine-terminated butadiene-acrylonitrile copolymers, respectively. Results of impact tests on these comparison samples are also shown in Table I.

TABLE I

| Impact Strength of D.E.R. ® 331 Epoxy Resin Modified with $\alpha, \omega$ - Functional Polydimethylsiloxanes | | | |
|---|---|---|---|
| Degree of Polymerization of Siloxane | Amount of Modifying Polymer (wt. %) | Impact Strength (ft - lb/in) | % Improvement Versus Control[3] |
| Examples of this Invention | | | |
| Modifying Polymer End Group | | | |
| Epoxide (allyl Glycidal Ether) | | | |
| 250 | 10 | 0.28 | 17 |
| Carboxyl | | | |
| 250 | 10 | 0.36 | 50 |
| 150 | 10 | 0.44 | 83 |
| 100 | 10 | 0.37 | 54 |
| Comparative Examples | | | |
| Modifying Polymer | | | |

TABLE I-continued

Impact Strength of D.E.R. ® 331 Epoxy Resin Modified with α, ω - Functional Polydimethylsiloxanes

|  | Degree of Polymerization of Siloxane | Amount of Modifying Polymer (wt. %) | Impact Strength (ft - lb/in) | % Improvement Versus Control[3] |
|---|---|---|---|---|
| None (control) | — | — | 0.24 | — |
| Hycar ® CTBN 1300 × 8[1] | — | 5 | 0.33 | 38 |
| Hycar ® CTBN 1300 × 8[1] | — | 5 | 0.22 | −8 |
| Hycar ® CTBN 1300 × 8[1] | — | 10 | 0.29 | 21 |
| Hycar ® ATBN 1300 × 16[2] | — | 5 | 0.24 | 0 |
| Trimethylsilyl-endblocked polydimethylsiloxane | 200 | 10 | 0.28 | 17 |

[1] Carboxyl-terminated butadiene-acrylonitrile copolymer (B. F. Goodrich Co.)
[2] Amine-terminated butadiene-acrylonitrile copolymer (B. F. Goodrich Co.)

[3] Calculated as: $100 \times \left( \frac{\text{Impact Strength of Sample}}{\text{Impact Strength of Control}} - 1 \right)$

EXAMPLE 10

Amine-functional polydimethysiloxanes, prepared according to the methods of Examples 4, 5 and 6, were used to modify D.E.R. ®331 as in Example 9. Results of impact tests on the similarly cured bars are given in Table II.

A comparative epoxy sample, modified with a dispersion of a high molecular weight, hydroxyl-terminated polydimethylsiloxane gum, was similarly evaluated and the result of impact testing is also reported in Table II. The dispersant used was similar to that described in Example 8. In this case, however, 7 parts of the siloxane resin copolymer were reacted with 13 parts of Ucon ®75-H-90,000 (Union Carbide Corporation, Danbury, CT). The resulting copolymer was mixed with an ethoxylate of a secondary alcohol, Tergitol ®15-S-9 (Union Carbide Corporation, Danbury, CT), and heated to 140° C. for about one hour. This dispersant was mixed with D.E.R. ®331 in a ratio of 1:3 and 27 parts of the resulting mixture was, in turn, mixed with 73 parts of the hydroxyl-terminated polydimethylsiloxane having a Williams plasticity of about 0.060 mils (ASTM D 926) to form a concentrate of said dispersant. The last mixing step was accomplished in a sigma-blade high shear mixer and resulted in a particle size of 1-2 microns for the dispersed gum. The concentrate so formed was further mixed with more epoxy resin to result in a final gum level of 10%, which composition was cured as described above.

TABLE II

Impact Strength of D.E.R. ® 331 Epoxy Resin Modified with α, ω - Functional Polydimethylsiloxanes

| Modifying Polymer End Group | Degree of Polymerization of Siloxane | Amount of Modifying Polymer (wt. %) | Impact Strength ft-lb/in) | % Improvement Versus Control |
|---|---|---|---|---|
| Examples of this invention | | | | |
| Carboxyl | 250 | 10 | 0.39 | 63 |
| Carboxyl | 40 | 5 | 0.32 | 33 |
| Carboxyl | 40 | 10 | 0.29 | 21 |
| Aminoethylpiperazine | 250 | 10 | 0.45 | 88 |
| " | 250 | 10 | 0.41 | 71 |
| Aminopropyl | 250 | 10 | 0.33 | 38 |
| Aminopropylaminoethyl | 250 | 10 | 0.40 | 67 |
| Epoxide | 250 | 10 | 0.32 | 33 |
| Comparative Examples | | | | |
| Control (no modification) | — | — | 0.24 | — |
| Hydroxyl-terminated Polydimethylsiloxane Gum | — | 10 | 0.26 | 8 |

EXAMPLE 11

Other epoxy resins and cure systems, were modified with the carboxy-functional and aminoethylpiperazine-functional siloxanes of this invention. Methods of sample preparation and testing were similar to those described in Example 9. In each case, the dispersant of Example 8 was incorporated in the formulation at 3 parts when 10 parts of silicone modifier was added and at 1.5 parts when 5 parts of said modifier was used.

Versamine ® F-20 (Henkel Corporation, Maywood, NJ) is described as a phenol-formaldehyde adduct, medium viscosity, fast curing agent for liquid and solid epoxy resins. This cure agent was employed at 43 parts, based on 100 parts of epoxy resin, and samples cured at 60° C. for 16 hours. Results of impact strength tests appear in Table III.

TABLE III

Impact Strength of D.E.R. ® 331* Epoxy Resin Modified with
α, ω - Functional Polydimethylsiloxanes

| Modifying Polymer End Group | Degree of Polymerization of Siloxane | Amount of Modifying Siloxane (wt. %) | Impact Strength (ft-lb/in) | % Improvement Versus Control |
| --- | --- | --- | --- | --- |
| None (control) | — | — | 0.24 | — |
| Aminoethylpiperazine | 250 | 10 | 0.41 | 71 |
| Aminoethylpiperazine | 250 | 10 | 0.52 | 117 |

*Cured with Versamine ® F-20 (Henkel Corp.)

Nadic Methyl Anhydride (Buffalo Color Corporation, West Patterson, NJ) is described as the maleic anhydride adduct of methylcyclopentadiene. This cure agent was employed at 100 parts, along with 2 parts of benzyl dimethylamine as an accelerator, both quantities based on 100 parts epoxy resin, and samples were cured at 100° C. for 24 hours. In addition to the D.E.R. ®331 previously described, an epoxy novolac resin, D.E.N. ®438 (Dow Chemical Company, Midland, MI) was also used. Test results for these specimens are presented in Table IV.

TABLE IV

Impact Strength of Epoxy Resins* Modified with
α, ω - Functional Polydimethylsiloxanes

| Modifying Polymer End Group | Degree of Polymerization of Siloxane | Amount of Modifying Siloxane (wt. %) | Impact Strength (ft-lb/in) | % Improvement Versus Control |
| --- | --- | --- | --- | --- |
| Epoxy = D.E.R. ® 331 | | | | |
| None (control) | — | — | 0.23 | — |
| Carboxyl | 250 | 10 | No Cure | — |
| Aminoethylpiperazine | 250 | 10 | 0.45 | 96 |
| Epoxy = D.E.N ® 438 | | | | |
| None (control) | — | — | 0.22 | — |
| Carboxyl | 250 | 10 | No Cure | — |
| Aminoethylpiperazine | 250 | 10 | 0.29 | 32 |

*Cured with Nadic ® Methyl Anhydride (Buffalo Color Corp.)

Hexahydrophthalic anhydride cure agent was employed at 105 parts, along with 12 parts of stannous octoate as an accelerator, both quantities based on 100 parts epoxy resin, and samples cured at 120° C. for 1 hour. The epoxy resin in this series was Araldite ® CY 179 (Ciba-Geigy Corporation, Hawthorne, NY), which resin is described as a very low viscosity alicyclic diepoxy carboxylate. Test results for these samples are given in Table V.

TABLE V

Impact Strength of Araldite ® CY179* Epoxy Resin Modified with
α, ω - Functional Polydimethylsiloxanes

| Modifying Polymer End Group | Degree of Polymerization of Siloxane | Amount of Modifying Siloxane (wt. %) | Impact Strength (ft-lb/in) | % Improvement Versus Control |
| --- | --- | --- | --- | --- |
| None (control) | — | — | 0.19 | — |
| Carboxyl | 100 | 5 | 0.21 | 11 |
| Carboxyl | 100 | 10 | 0.23 | 21 |
| Carboxyl | 250 | 5 | 0.23 | 21 |
| Carboxyl | 250 | 10 | 0.25 | 32 |

*Ciba-Geigy Corp.

In most cases, the cured epoxy compositions based on the dispersions of this invention showed improvement in impact strength ranging approximately from 20 to 100% relative to controls which were not so modified.

I claim:
1. A dispersion comprising:
   a. from about 78 to 94.5 percent by weight of a curable epoxy resin;
   b. from about 5 to 20 percent by weight of an alpha,omega-functional polydimethylsiloxane having an average degree of polymerization between 30 and 400 and having endblocking groups containing carboxyl, amine or epoxide functionality; and
   c. from about 0.5 to 2.0 percent by weight of a dispersing agent capable of maintaining (b) dispersed in (a), said dispersing agent being a siloxane copolymer selected from the group consisting of
   1. copolymers consisting essentially of $SiO_2$ units, $(CH_3)_3SiO_{\frac{1}{2}}$ units and $D(CH_3)_2SiO_{\frac{1}{2}}$ units in which D is a polyoxyethylene polymer having a molecular weight between 1000 and 5000, or a polyoxyethylene-polyoxypropylene copolymer having a molecular weight between 1000 and 6000 wherein the polyoxypropylene portion constitutes up to 100 mole percent of the copolymer, said D being attached to the silicon atom via a silicon-carbon bond, and the ratio of the $SiO_2$ units to the total $(CH_3)_3SiO_{\frac{1}{2}}$ and $D(CH_3)_2SiO_{\frac{1}{2}}$ units is in the range of 1:0.4 to 1:1.2,
   2. copolymers which are reaction products derived from heating a mixture of a siloxane resin copolymer consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1:0.4 to 1:1.2, and a hydroxylated polyoxyethylene polymer having a molecular weight in the range of 1000 to 5000 or a hydroxylated polyoxyethylene- polyoxypropylene copolymer having a molecular weight in the range of 1000 to 6000 wherein the polyoxypropylene portion constitutes up to 100 mole percent of the copolymer, 3. polydimethylsiloxane-organic copolymer in which the polydimethylsiloxane portion has a molecular weight between 1500 and 2000 and the organic portion consists essentially of a polyoxyethylene polymer having a molecular weight between 1000 and 2000, or a polyoxyethylene-polyoxypropylene copolymer having a molecular weight between 1500 and 4000 wherein said polyoxypropylene portion constitutes up to 100 mole percent of organic portion of the copolymer, said organic portion being attached to silicon atoms via silicon-carbon bonds, and 4. polydimethylsiloxane-organic copolymers which are the reaction products produced by heating a mixture of a polydimethylsiloxane containing silicon bonded hydrogen atoms having a molecular weight between 1500 and 2000 and a hydroxylated polyoxyethylene having a molecular weight between 1000 and 2000, or a hydroxylated polyoxyethylene-polyoxypropylene copolymer having a molecular weight between 1500 and 4000 wherein said polyoxypropylene constitutes up to 100 mole percent of the organic portion of the copolymer.

2. The dispersion of claim 1, wherein said endblocking group of component (b) is represented by a formula selected from the group consisting of

—C$_{10}$H$_{20}$COOH, —CH$_2$CH$_2$CH$_2$—NH$_2$,

—CH$_2$CH$_2$CH$_2$—N—CH$_2$CH$_2$NH$_2$,
               H

—CH$_2$CHCH$_2$—N—CH$_2$CH$_2$NH$_2$,
    |       H
   CH$_3$

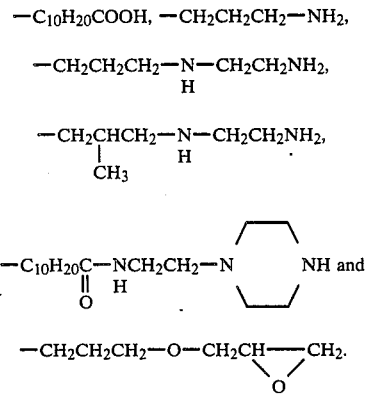 and

—CH$_2$CH$_2$CH$_2$—O—CH$_2$CH———CH$_2$.
                        \ /
                         O

3. The dispersion of claim 1, wherein the dispersing agent (c) is the copolymeric product (1).

4. The dispersion of claim 1, wherein the dispersing agent (c) is the copolymeric product (2).

5. The dispersion of claim 1, wherein the dispersing agent (c) is the copolymeric product (3).

6. The dispersion of claim 1, wherein the dispersing agent (c) is the copolymeric product (4).

7. The dispersion of claim 4, wherein said alpha,omega-functional polydimethylsiloxane has an average degree of polymerization from 30 to 300 and constitutes from 5 to 10% of the dispersion.

8. The dispersion of claim 7, wherein said alpha,omega-functional polydimethylsiloxane is endblocked with groups represented by the formula —C$_{10}$H$_{20}$COOH.

9. The dispersion of claim 7, wherein said alpha,omega-functional polydimethylsiloxane is endblocked with groups represented by the formula

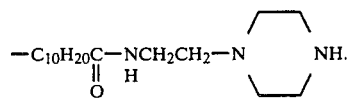

10. The dispersion of claim 7, wherein said alpha,omega-functional polydimethylsiloxane is endblocked with groups represented by the formula —CH$_2$CH$_2$CH$_2$—NH$_2$.

11. The dispersion of claim 7, wherein said alpha,omega-functional polydimethylsiloxane is endblocked with groups represented by the the formula

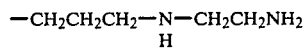

12. The dispersion of claim 7, wherein said alpha,omega-functional polydimethylsiloxane is endblocked with groups represented by the formula

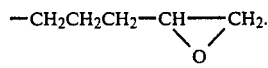

13. A method for improving the impact resistance of a curable epoxy resin, comprising:
(A) emulsifying in an epoxy resin from about 5 to 20 percent by weight of an alpha,omega-functional polydimethylsiloxane having an average degree of polymerization between 30 and 400 and having endblocking groups containing carboxyl, amine or epoxide functionally, using as dispersing agent from about 0.5 to 2.0 percent by weight of a copolymer selected from the group consisting of 1. copolymers consisting essentially of SiO$_2$ units, (CH$_3$)$_3$SiO$_{\frac{1}{2}}$units and D(CH$_3$)$_2$SiO$_{\frac{1}{2}}$units in which D is a polyoxyethylene polymer having a molecular weight between 1000 and 5000, or a polyoxyethylene-polyoxypropylene copolymer having a molecular weight between 1000 and 6000 wherein the polyoxypropylene portion constitutes up to 100 mole percent of the copolymer, said D being attached to the silicon atom via a silicon-carbon bond, and the ratio of the SiO$_2$ units to the total (CH$_3$)$_3$SiO$_{\frac{1}{2}}$and D(CH$_3$)$_2$SiO$_{\frac{1}{2}}$units is in the range of 1:0.4 to 1:1.2.

2. copolymers which are reaction products derived from heating a mixture of a siloxane resin copolymer consisting essentially of SiO$_2$ units and (CH$_3$)$_3$SiO$_{\frac{1}{2}}$units in which the ratio of SiO$_2$ units to (CH$_3$)$_3$SiO$_{\frac{1}{2}}$units is in the range of 1:0.4 to 1:1.2, and a hydroxylated polyoxyethylene polymer having a molecular weight in the range of 1000 to 5000 or a hydroxylated polyoxyethylene-polyoxypropylene copolymer having molecular weight in the range of 1000 to 6000 wherein the polyoxypropylene portion constitutes up to 100 mole percent of the copolymer, 3. polydimethylsiloxane-organic copolymer in which the polydimethylsiloxane portion has a molecular weight between 1500 and 2000 and the organic portion consists essentially of a polyoxyethylene polymer having a molecular weight between 1000 and 2000, or a polyoxyethylene-polyoxypropylene copolymer having a molecular weight between 1500 and 4000 wherein said polyoxypropylene portion constitutes up to 100 mole percent of organic portion of the copolymer, said organic portion being attached to silicon atoms via silicon-carbon bonds, and 4. polydimethylsiloxane-organic copolymers which are the reaction products produced by heating a mixture of a polydimethylsiloxane containing silicon bonded hydrogen atoms having a molecular weight between 1500 and 2000 and a hydroxylated polyoxyethylene having a molecular weight between 1000 and 2000, or a hydroxylated polyoxyethylene-polyoxypropylene copolymer haing a molecular weight between 1500 and 4000 wherein said polyoxypropylene constitutes up to 100 mole percent of the organic portion of the copolymer to form a homogeneous dispersion;

(B) mixing said dispersion with an appropriate amount of a cure agent for the epoxy resin to produce a uniform mixture therebetween; and (C) curing the mixture obtained in step B.

14. The method of claim 13, wherein said endblocking group of component (b) is represented by a formula selected from the group consisting of —C$_{10}$H$_{20}$COOH, —CH$_2$CH$_2$CH$_2$—NH$_2$, 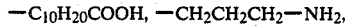

-continued

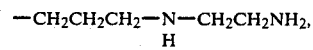

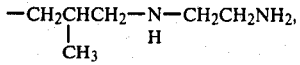

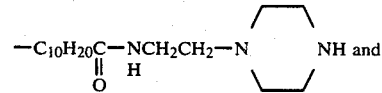

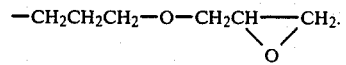

15. The method of claim 13, wherein said dispersing agent is the copolymeric product 2.

16. The method of claim 15, wherein said alpha,omega-functional polydimethylsiloxane has a degree of polymerization from 30 to 300 and constitutes from 5 to 10 percent of the dispersion of step A.

17. An article of manufacture, comprising a cured epoxy composite prepared in accordance with claim 13.

18. An article of manufacture, comprising a cured epoxy composite prepared in accordance with claim 14.

19. An article of manufacture, comprising a cured epoxy composite prepared in accordance with claim 15.

20. An article of manufacture, comprising a cured epoxy composite prepared in accordance with claim 16.

* * * * *